United States Patent
Chen

(10) Patent No.: US 8,413,563 B2
(45) Date of Patent: Apr. 9, 2013

(54) HEIGHT ADJUSTMENT DEVICE FOR BAND SAW

(75) Inventor: Chun-Jung Chen, Taichung County (TW)

(73) Assignee: Hsuan-Chu Liu, Taichung County (TW)

( * ) Notice: Subject to any disclaimer, the term of this patent is extended or adjusted under 35 U.S.C. 154(b) by 837 days.

(21) Appl. No.: 12/555,836

(22) Filed: Sep. 9, 2009

(65) Prior Publication Data

US 2011/0000356 A1 Jan. 6, 2011

(51) Int. Cl.
*B26D 1/54* (2006.01)

(52) U.S. Cl.
USPC .................................. 83/788; 83/814; 83/820

(58) Field of Classification Search .................. 83/820, 83/814, 812, 810, 397, 809, 478, 860, 829, 83/698.11, 801, 816–818
See application file for complete search history.

(56) References Cited

U.S. PATENT DOCUMENTS

| | | | | |
|---|---|---|---|---|
| 978,412 A * | 12/1910 | Trout | | 83/820 |
| 1,054,288 A * | 2/1913 | Fleming | | 83/814 |
| 1,909,314 A * | 5/1933 | Pettibone | | 83/372 |
| 2,371,731 A * | 3/1945 | Boice et al. | | 83/814 |
| 2,695,637 A * | 11/1954 | Ocenasek | | 83/814 |
| 3,888,148 A * | 6/1975 | Weissman | | 83/100 |
| 4,016,856 A * | 4/1977 | McLaughlin | | 125/21 |
| 4,882,962 A * | 11/1989 | Terpstra et al. | | 83/812 |
| 6,240,825 B1 * | 6/2001 | Xie | | 83/820 |
| 6,595,097 B2 * | 7/2003 | Lee | | 83/814 |
| 6,679,148 B2 * | 1/2004 | Chiang | | 83/788 |
| 6,739,231 B2 * | 5/2004 | Snodgrass, Jr. | | 83/816 |
| 6,786,124 B1 * | 9/2004 | Huang | | 83/520 |
| 6,857,347 B1 * | 2/2005 | Benedict et al. | | 83/546 |
| 7,077,041 B2 * | 7/2006 | Kunkel et al. | | 83/34 |
| 7,493,842 B2 * | 2/2009 | Feng | | 83/816 |
| 7,520,202 B2 * | 4/2009 | Wang | | 83/820 |
| 2008/0028909 A1 * | 2/2008 | Lin | | 83/820 |

FOREIGN PATENT DOCUMENTS

JP 02180521 A * 7/1990

* cited by examiner

*Primary Examiner* — Omar Flores Sanchez

(74) *Attorney, Agent, or Firm* — Browdy and Neimark, PLLC

(57) ABSTRACT

A height adjustment device for a band saw includes a manual driving unit and an automatic driving unit. When one of the manual driving unit and the automatic driving unit is damaged, the user can operate the other to adjust the height where a saw blade guiding device is located, thereby ensuring a smooth running of the production line and improving the production efficiency.

13 Claims, 10 Drawing Sheets

HEIGHT ADJUSTMENT DEVICE FOR BAND SAW

BACKGROUND OF THE INVENTION

1. Field of the Invention

The present invention relates generally to a band saw, and more specifically to a height adjustment device for a band saw for adjusting the height that a saw blade guiding device of the band saw is located according to the height of a workpiece.

2. Description of the Related Art

A conventional band saw is equipped with a saw blade guiding device for forcibly holding a saw blade and guiding its movement to prevent the saw blade from bias and breakage, thereby enhancing the cutting precision. However, different types of workpieces have different heights, such that a height location adjustment device is needed for adjusting the height of location of the saw blade guiding device so as to avoid interference between the saw blade guiding device and the workpiece.

The conventional height adjustment devices generally include two types, i.e. a manual type and an automatic type. No matter which type of the height adjustment device is applied, the band saw will stop working once any component of the height adjustment device is damaged, thus delaying the production line and bringing forth loses in production cost.

SUMMARY OF THE INVENTION

It is one objective of the present invention to provide a height adjustment device for a band saw, which can be operated manually or automatically to ensure a smooth running of the production line and enhance the production efficiency.

To achieve this objective of the present invention, the height adjustment device comprises a base having a through hole; a guide rod passing through the through hole of the base for connection with a saw blade guiding device and being axially movable relative to the base; a first gear rack mounted to the guide rod and passing through the through hole of the base; a first driving unit having a wheel, a first gear disposed in the base, and a linking rod having two ends respectively connected to the wheel and the first gear in such a manner that the first gear can be engaged with the first gear rack through the movement of the linking rod, a second gear rack mounted to the guide rod and passing through the through hole of the base; and a second driving unit having a motor mounted to the base and a worm connected to the motor.

In a first preferred embodiment of the present invention, the second driving unit further comprises a second gear engaged with the worm and the second gear rack such that the second gear rack is driven by the rotation of the second gear to force the guide rod to move along the second gear rack.

In a second preferred embodiment of the present invention, the second driving unit further comprises a second wheel, a second gear, and a second linking rod having two ends respectively connected to the second wheel and the second gear, such that the second gear can be engaged with the worm and the second gear rack through the movement of the second linking rod for allowing the second gear rack and the guide rod to be moved through the actuation of the worm and the motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
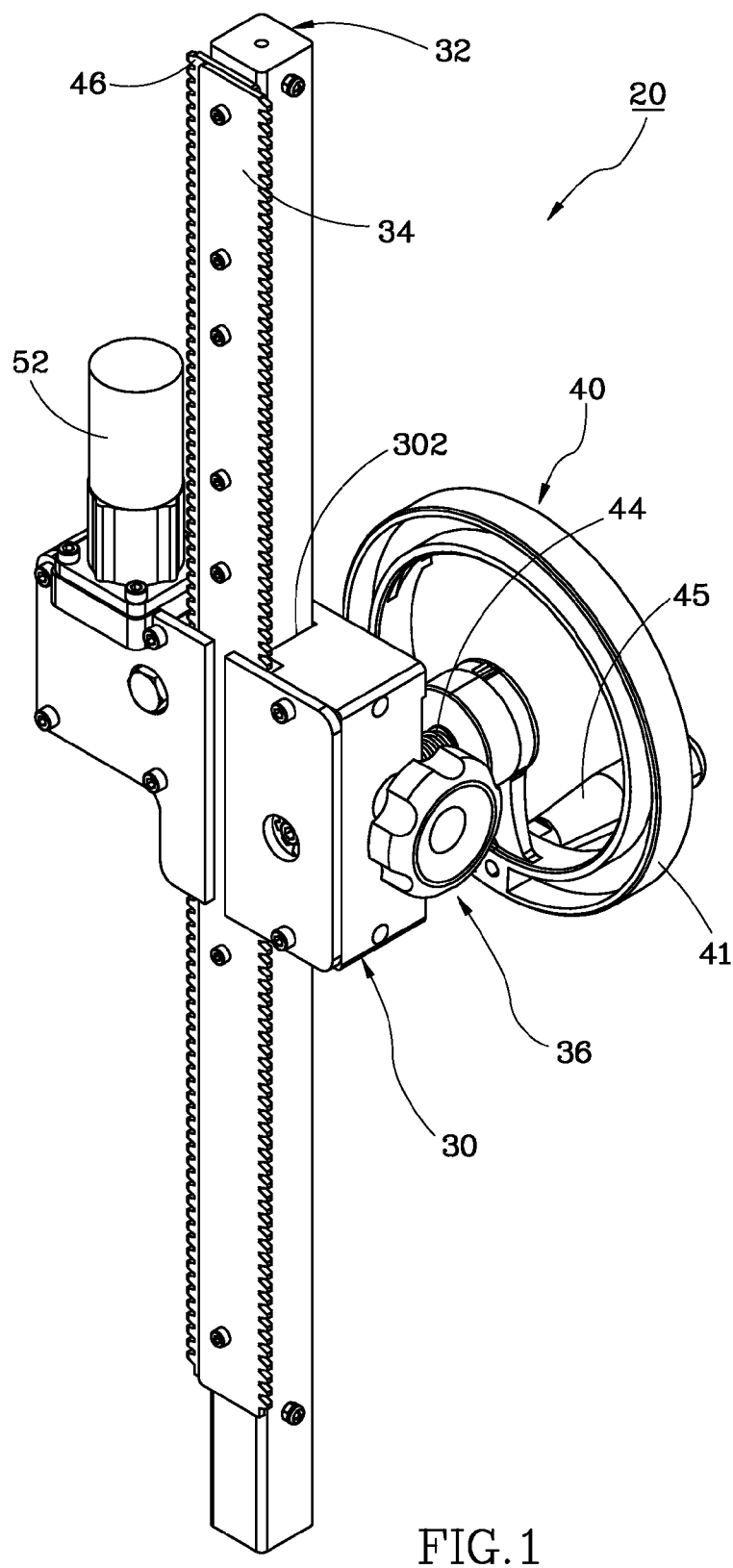
FIG. 1 is a perspective view of a height adjustment device according to a first preferred embodiment of the prevent invention.
Figure 2:
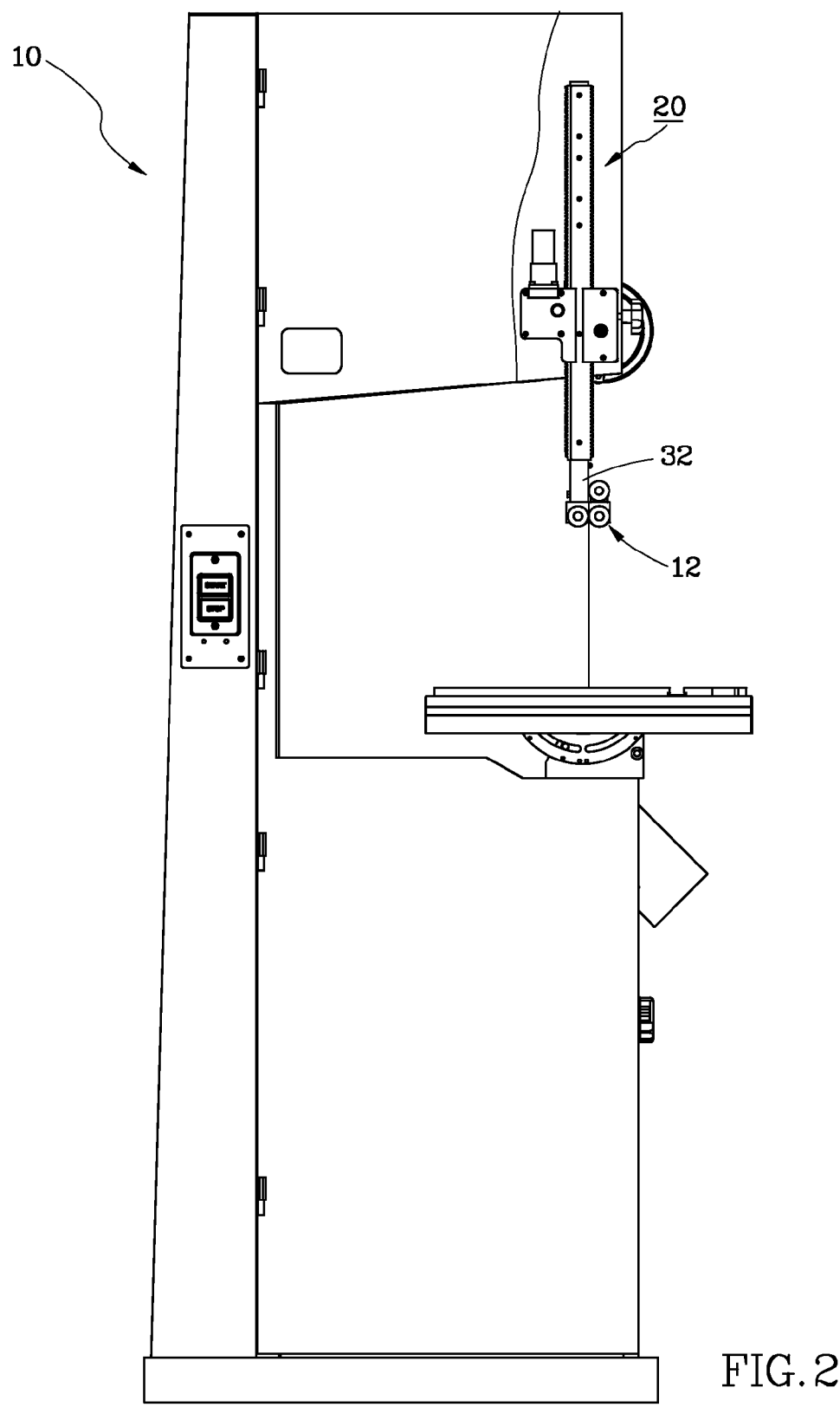
FIG. 2 is a front view of a band saw equipped with the height adjustment device according to the first preferred embodiment of the prevent invention.
Figure 3:
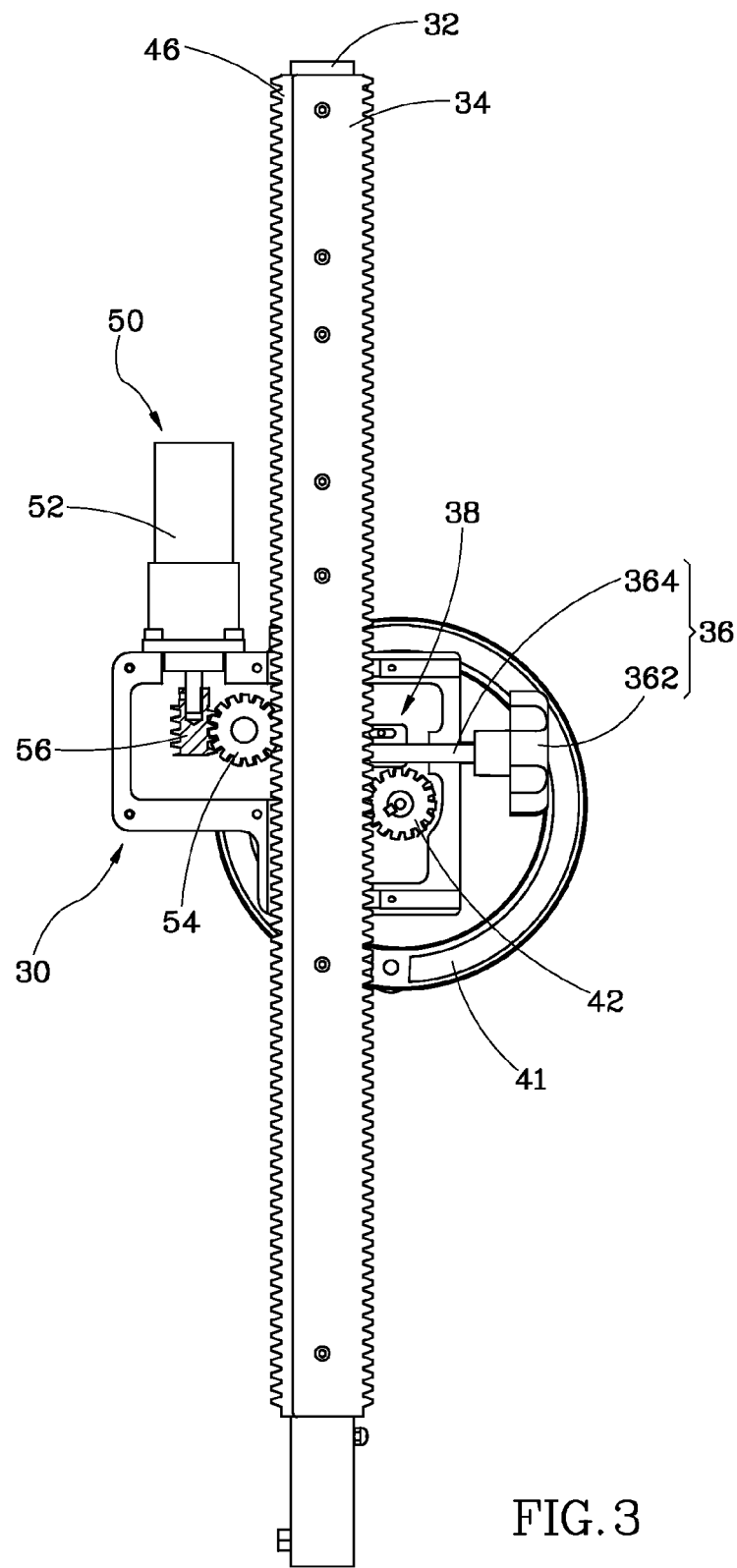
FIG. 3 is a partially cutaway view of the height adjustment device according to the first preferred embodiment of the prevent invention.

Referring to FIGS. 1 to 3, a height adjustment device 20 in accordance with a first preferred embodiment of the present invention is installed in a band saw 10, comprising a base 30, a first guide rod 32, a first gear rack 34, an urging member 36, a first driving unit 40, a second gear rack 46, and a second driving unit 50.

The base 30 is hollow, having a through hole 302 running through top and bottom sides thereof.

The guide rod 32 passes through the though hole 302 of the base 30 to be axially movable relative to the base 30, having a bottom end connected to a saw blade guiding device 12, as shown in FIG. 2. Since the saw blade guiding device 12 belongs to the prior art, the detailed structure thereof will not be necessarily described hereunder.

The first gear rack 34 is fastened to a front side of the guide rod 32 and passes through the through hole 302 of the base 30 for movement along with the guide rod 32.

The urging member 36 has a head portion 362 and a body portion 364. The body portion 364 has one end connected to the head portion 362, and the other end inserted into the base 30 to be stopped against a L-shaped washer 38 fastened to the base 30 and abutting against the guide rod 32 such that the washer 38 can be tightly stopped against the guide rod 32 to prevent the guide rod 32 from free movement.

Figure 4:
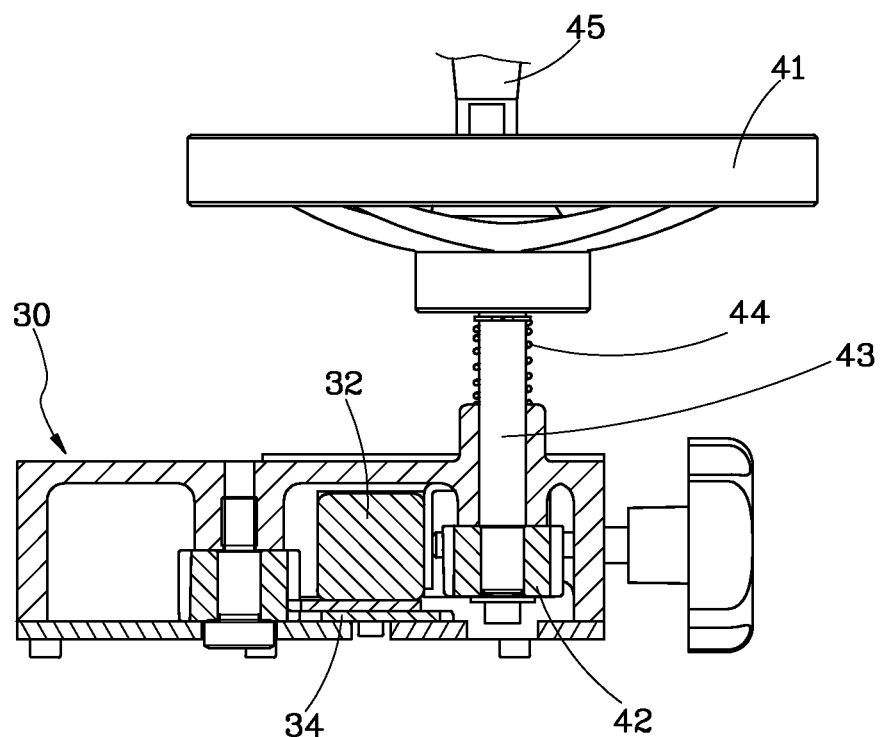
FIG. 4 is a partially cutaway top view of the height adjustment device according to the first preferred embodiment of the prevent invention, showing the first gear and the first gear rack are disengaged from each other.
Figure 5:
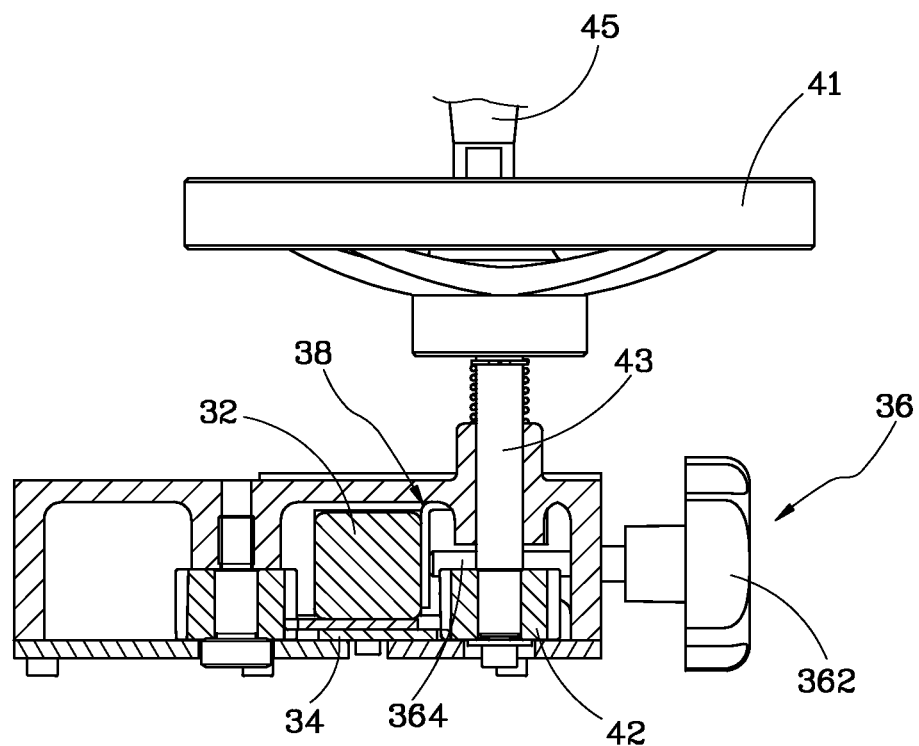
FIG. 5 is similar to FIG. 4, showing the first gear and the first gear rack are engaged with each other.

Referring to FIGS. 4 and 5 in view of FIG. 3, the first driving unit 40 includes a wheel 41, a first gear 42, a linking rod 43, an elastic member 44, and a handle 45. The linking rod 43 has one end connected to the wheel 41 and the other end thereof inserted into the base 30 for connection with the first gear 42 in such a way that the linking rod 43 can be moved along a direction perpendicular to an axial direction of the guide rod 32 to enable the first gear 42 to be engaged with or disengaged from the first gear rack 34. The elastic member 44 is sleeved onto the linking rod 43 and has two ends respectively stopped against the base 30 and the wheel 41 for providing an elastic force which can push the wheel 41 away from the base 30, causing disengagement of the first gear 42 from the first gear rack 34. The handle 45 is fastened to the wheel 41 to drive the wheel 41 to rotate for enabling the first gear 42 to rotate synchronously through the linking rod 43.

The second gear rack 46 is fastened to the front side of the guide rod 32 and located between the first gear rack 34 and the guide rod 32 so as to pass through the through hole 302 of the base 30 for movement along with the guide rod 32.

In this embodiment, the second driving unit 50 includes a motor 52 mounted to a top side of the base 30, a second gear 54 rotatably disposed in the base 30 and engaged with the second gear rack 46, and a worm 56 connected with the motor 52 and engaged with the second gear 54 in such a way that the worm 56 can be forced by the motor 52 to drive the second gear 54 to rotate.

Figure 6:
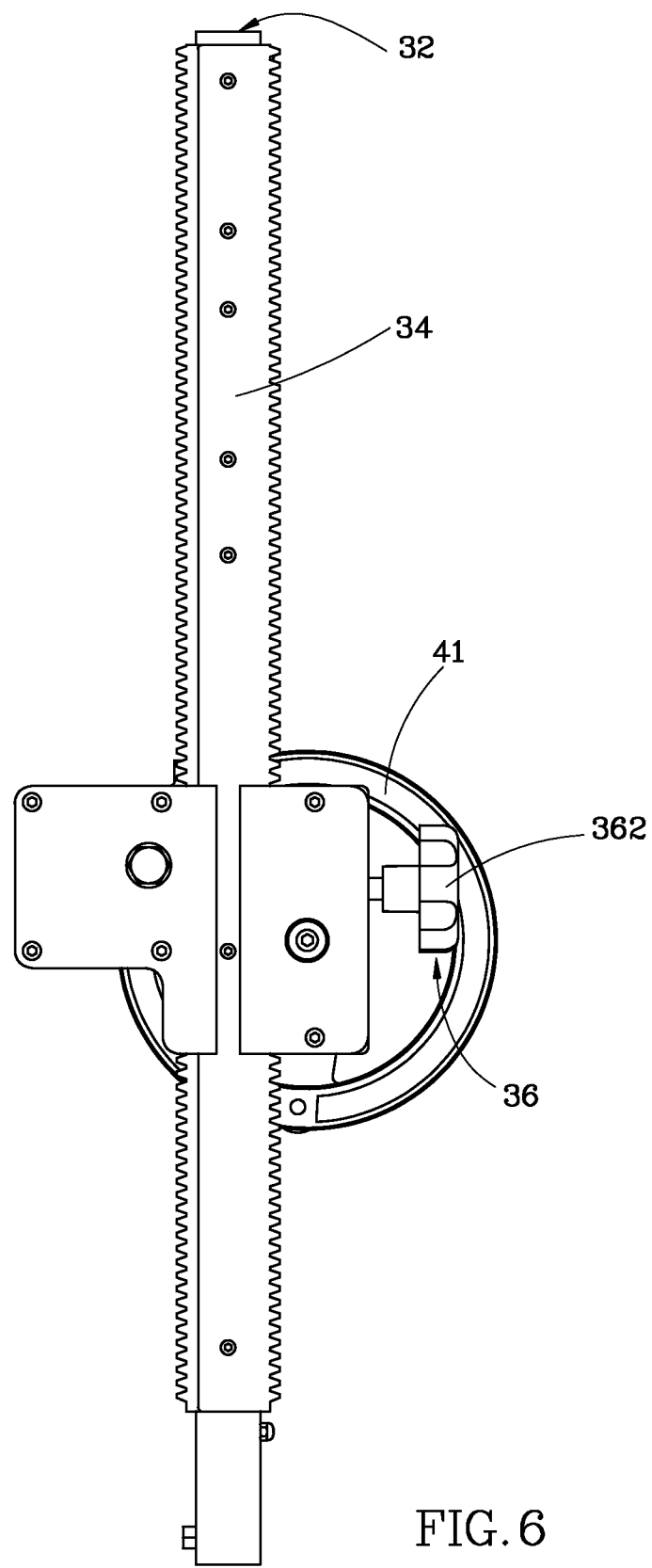
FIG. 6 is a front view of the height adjustment device according to the first preferred embodiment of the prevent invention, showing the guide rod is moved upwards by the first gear rack driven by the first driving unit.

When deciding to adjust the height of location of the saw blade guiding device 12, a user needs to detach the motor 52 and the worm 56 from the base 30 at first. Next, the user can press the wheel 41 to force the first gear 42 to be engaged with the first gear rack 34, as shown in FIGS. 4 and 5, and then rotate the wheel 41 through the handle 45 to drive the first gear 42 to rotate. At this time, the first gear rack 34 can be driven by the rotation of the first gear 42 to move the guide rod 32, as shown in FIG. 6. When the location of the saw blade guiding device 12 is adjusted to a suitable height through the movement of the guide rod 32, the user can turn the head portion 362 of the urging member 36 to stop the movement of the guide rod 32 through the body portion 364 of the urging member 36, as shown in FIG. 5, and then can release the force applied to the wheel 41 to keep the disengagement of the first gear 42 from the first gear rack 34 through the elastic member 44, as shown in FIG. 4.

Figure 7:
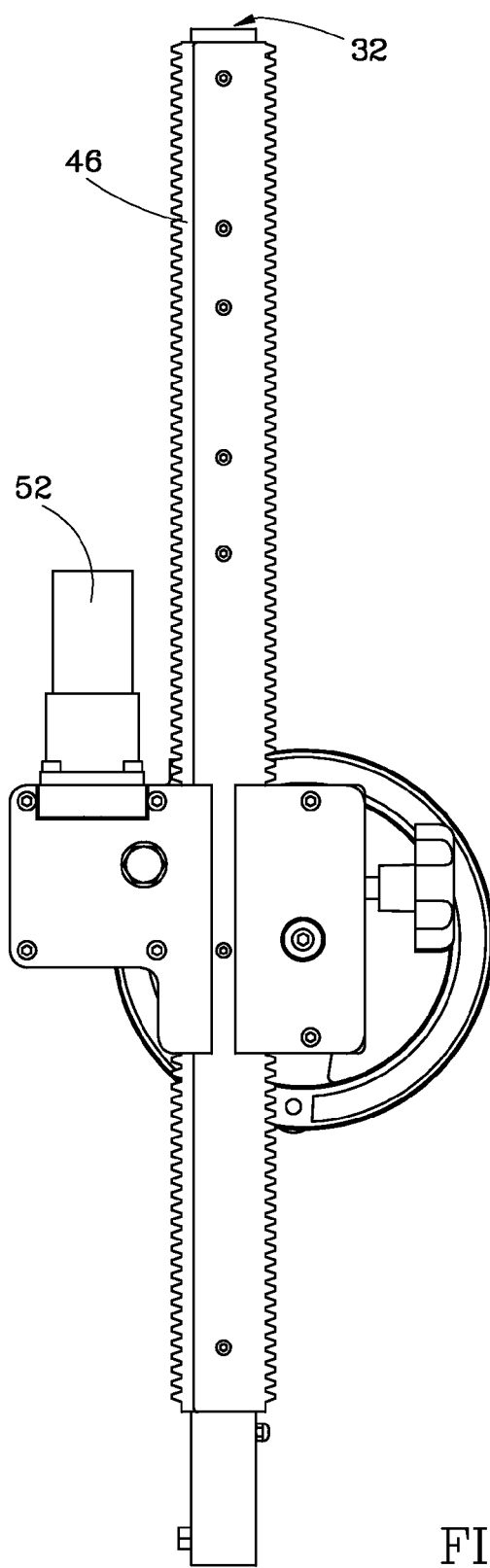
FIG. 7 is a front view of the height adjustment device according to the first preferred embodiment of the prevent invention, showing the guide rod is moved upwards by the second gear rack driven by the second driving unit.

On the contrary, when deciding to adjust the height of location of the saw blade guiding device 12, the user can start the motor 52 to drive the second gear 54 to rotate through the worm 56 such that the second gear rack 46 can be driven by the rotation of the second gear 54 to move the guide rod 32, as shown in FIGS. 3 and 7. When the location of the saw blade guiding device 12 is adjusted to a suitable height through the movement of the guide rod 32, the user can turn off the motor 52 to stop the movement of the guide rod 32.

As indicated above, the first driving unit and the second driving unit can be operated manually or automatically to adjust the height of location of the saw blade guiding device. Even though one of the first driving unit and the second driving unit is damaged, the other can still be used for the height adjustment of the saw blade guiding device, thus ensuring a smooth running of the production line and improving the production efficiency.

Figure 8:
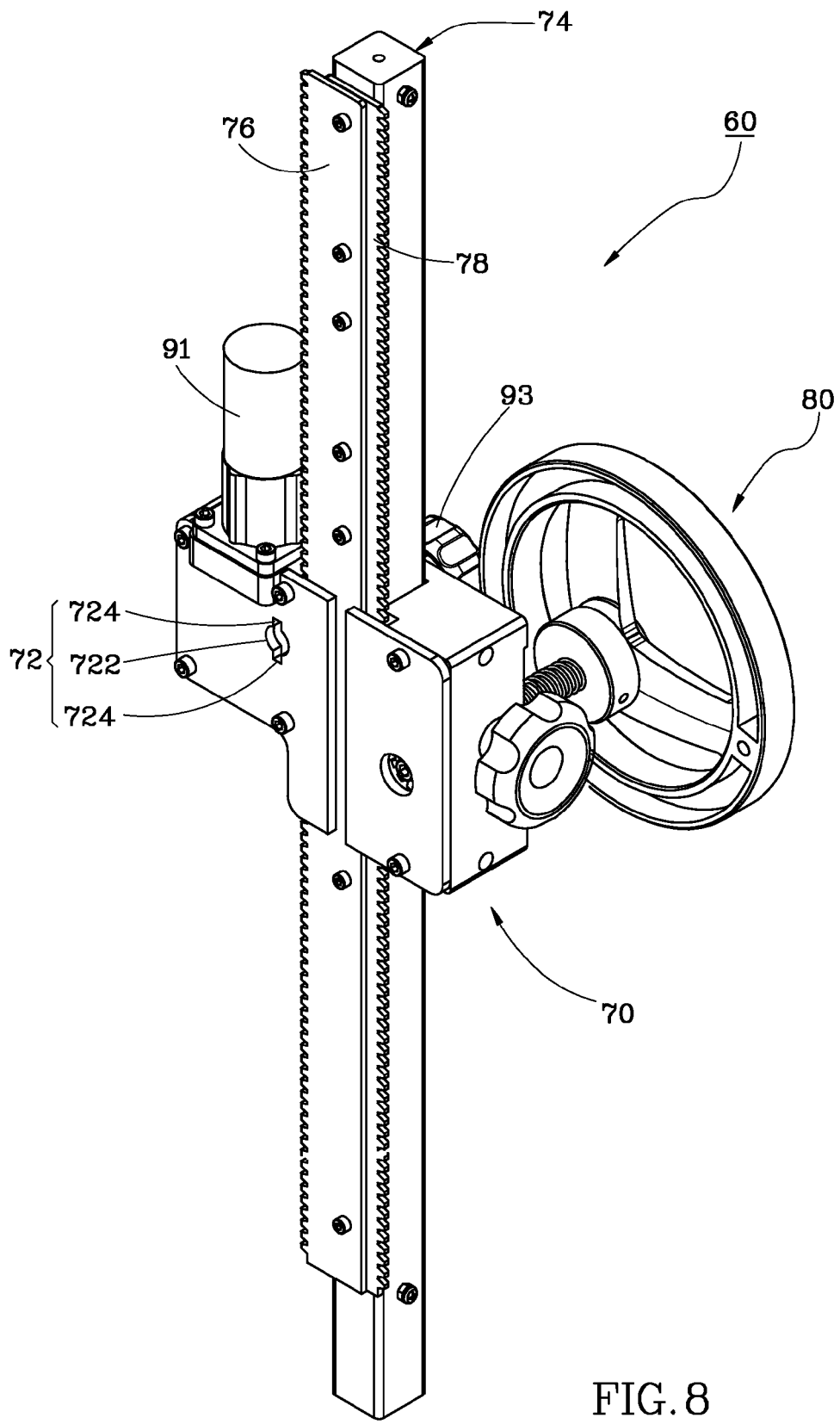
FIG. 8 is a perspective view of the height adjustment device according to a second preferred embodiment of the prevent invention.
Figure 9:
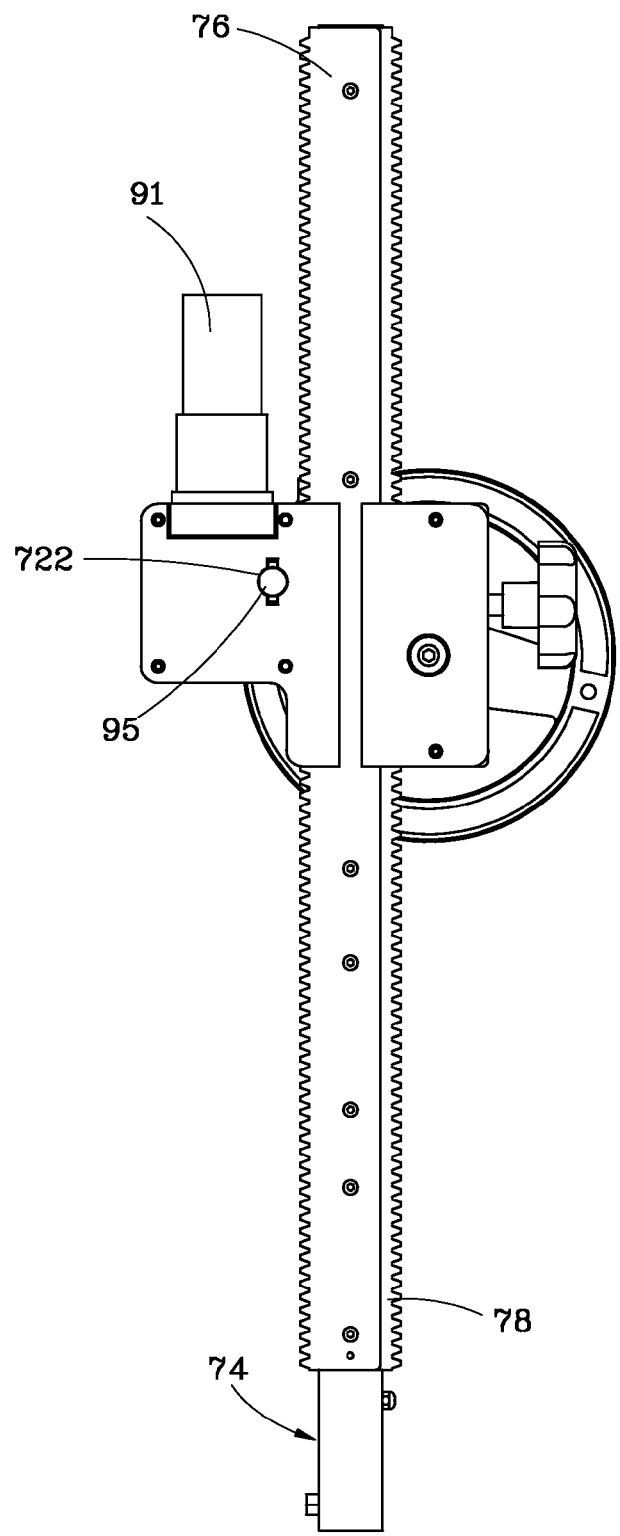
FIG. 9 is a front view of the height adjustment device according to the second preferred embodiment of the prevent invention.

FIGS. 8 and 9 show the height adjustment device 60 in accordance with a second preferred embodiment of the present invention, which is similar to the first embodiment and has the difference recited below. In this embodiment, the base 70 has a retaining hole 72 with a large hole portion 722 and two opposite small hole portions 724. The first gear rack 78 is located between the guide rod 74 and the second gear rack 76.

Figure 10:
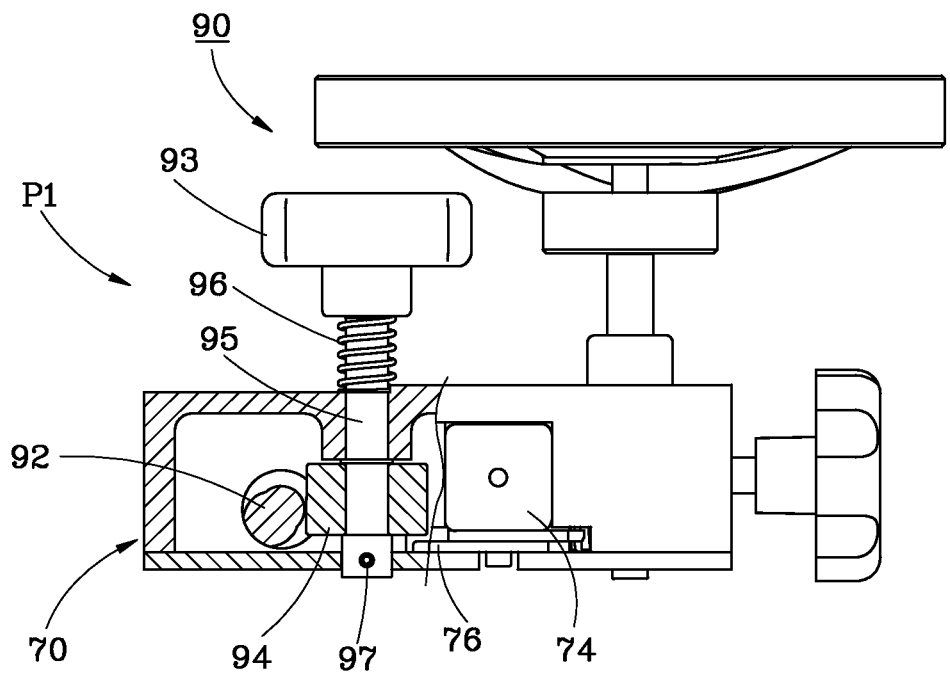
FIG. 10 is a partially cutaway top view of the height adjustment device according to the second preferred embodiment of the prevent invention, showing the second gear is disengaged from the second gear rack and the worm.

Referring to FIGS. 9 and 10, the second driving unit 90 includes a motor 91, a worm 92, a second wheel 93, a second gear 94, a second linking rod 95, a second elastic member 96, and a pin 97. The motor 91 is mounted to the top side of the base 70. The worm 92 is connected to the motor 91 and located in the base 70. The second linking rod 95 has a rear end connected to the second wheel 93 and a front end thereof inserted into the base 70 for connection with the second gear 94 in such a way that the second linking rod 95 is axially movable along a direction perpendicular to the axial direction of the guide rod 74 for enabling the second gear 94 to be engagable with the worm 92 and the second gear rack 76 through the movement of the second linking rod 95. The second elastic member 96 is sleeved onto the second linking rod 95 and provided with two ends respectively stopped against the base 70 and the second wheel 93 for providing an elastic force which can push the second wheel 93 away from the base 70, thus keeping disengagement of the second gear 94 from the worm 92 and the second gear rack 76. The pin 97 is inserted into a front end of the second linking rod 95 to be moved along with the second linking rod 95.

The way of operating the first driving unit 80 of the height adjustment device 60 is the same as that of the first preferred embodiment, but it is not necessary to detach the motor 91 and the worm 92 of the second driving unit 90 from the base 70 during the operation of the first driving unit 80.

Figure 11:
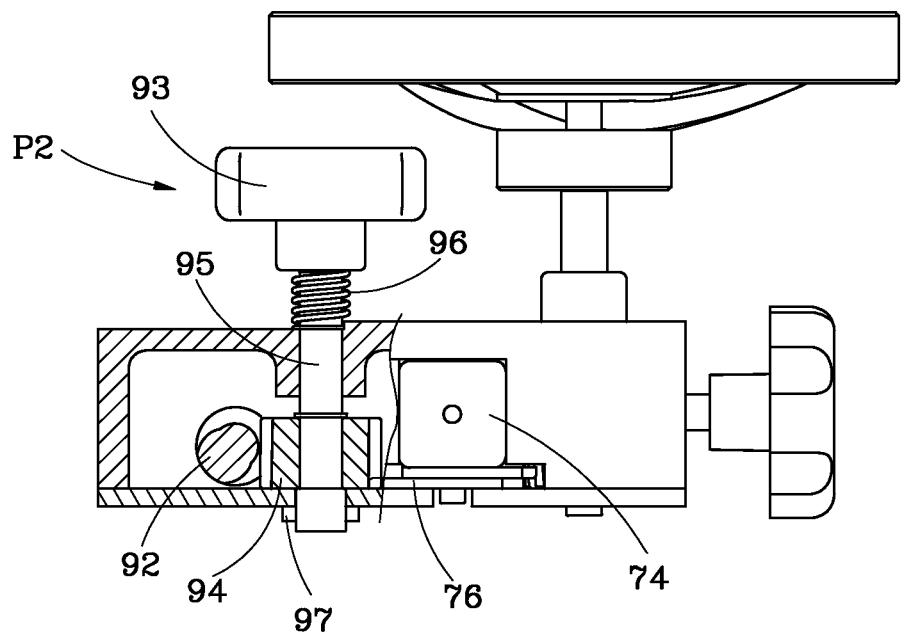
FIG. 11 is similar to FIG. 10, showing the second gear is engaged with the worm and the second rack and the worm.
Figure 12:
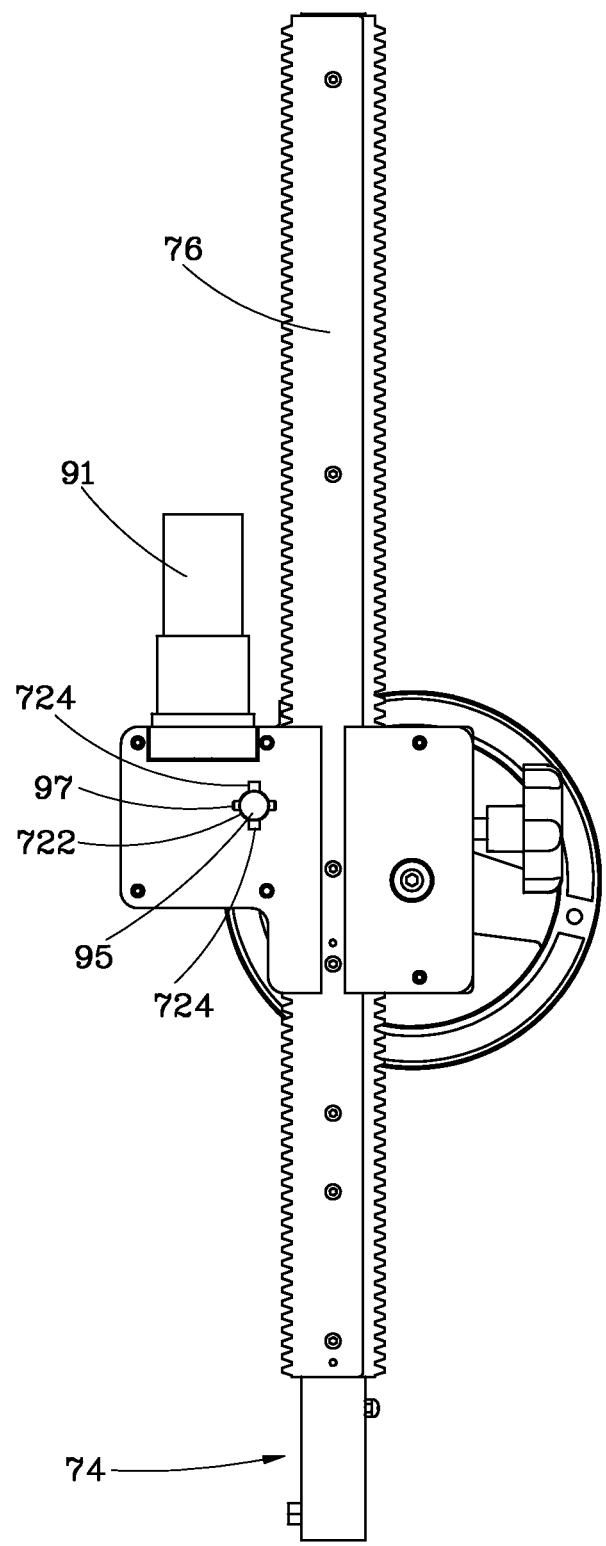
FIG. 12 is a front view of the height adjustment device according to the second preferred embodiment of the prevent invention, showing the guide rod is moved upwards by the second gear rack driven by the second driving unit.

Before the second driving unit 90 is operated, the second wheel 93 is located at a first position P1, as shown in FIG. 10. When operating the second driving unit 90, the user can press the second wheel 93 to force the second gear 94 to be engaged with the worm 92 and the second gear rack 76 through the movement of the linking rod 95. At this time, the front end of the second linking rod 95 passes through the large hole portion 722 of the retaining hole 72 of the base 70, and the pin 97 passes through the small hole portions 724 of the retaining hole 72 of the base 70. Next, the user can turn the second wheel 93 for 90 degrees from the first position P1 to a second position P2 where the pin 97 orthogonally crosses the small hole portions 724, as shown in FIGS. 11 and 12. In this way, the front end of the second linking rod 95 can be retained in the large hole portion 722 without moving back to its initial position to keep engagement of the second gear 94, the worm 92, and the second gear rack 76, thus allowing the user to turn on the motor 91 to move the location of the guide rod 74 to a suitable height, as shown in FIG. 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A height adjustment device for adjusting the height where a saw blade guiding device of a band saw is located, the height adjustment device comprising:

a base having a through hole running through top and bottom sides thereof;

a guide rod passing through the through hole of the base for connection with the saw blade guiding device, the guide rod being axially movable relative to the base;

a first gear rack mounted to the guide rod and passing through the through hole of the base;

a first driving unit having a wheel, a first gear disposed in the base, and a linking rod having two ends respectively connected to the wheel and the first gear, the linking rod being movable along a direction perpendicular to an axial direction of the guide rod for enabling the first gear to be engaged with the first gear rack through the movement of the linking rod;

a second gear rack mounted to the guide rod and passing through the through hole of the base; and a second driving unit having a motor mounted to the base, a second gear rotatably disposed in the base and engaged with the second gear rack, and a worm connected to the motor and engaged with the second gear.

2. The height adjustment device as claimed in claim 1 further comprising an urging member, wherein the urging member is movably inserted into the base to prevent the guide rod from free movement.

3. The height adjustment device as claimed in claim 2, wherein the urging member is stopped against a washer fastened to the base and abutting against the guide rod.

4. The height adjustment device as claimed in claim 1, wherein the first driving unit further has a handle connected to the wheel.

5. The height adjustment device as claimed in claim 1, wherein the second gear rack is located between the guide rod and the first gear rack.

6. The height adjustment device as claimed in claim 1, wherein the first driving unit further has an elastic member sleeved onto the linking rod and provided with two ends respectively stopped against the base and the wheel.

7. A height adjustment device for adjusting the height where a saw blade guiding device of a band saw is located, the height adjustment device comprising:

a base having a through hole running through top and bottom sides thereof;

a guide rod passing through the through hole of the base for connection with the saw blade guiding device and being axially movable relative to the base;

a first gear rack mounted to the guide rod and passing through the through hole of the base;

a first driving unit having a first wheel, a first gear disposed in the base, and a first linking rod having two ends respectively connected to the first wheel and the first gear, the first linking rod being movable along a direction perpendicular to an axial direction of the guide rod for enabling the first gear to be engaged with the first gear rack through the movement of the first linking rod;

a second gear rack mounted to the guide rod and passing through the through hole of the base; and a second driving unit having a motor mounted to the base, a worm connected to the motor, a second wheel, a second gear disposed in the base, and a second linking rod having two ends respectively connected to the second wheel and the second gear, the second linking rod being movable along a direction perpendicular to the axial direction of the guide rod for enabling the second gear to be engaged with the worm and the second gear rack through the movement of the second linking rod.

8. The height adjustment device as claimed in claim 7 further comprising an urging member movably inserted into the base to prevent the guide rod from free movement.

9. The height adjustment device as claimed in claim 8, wherein the urging member is stopped against a washer fastened to the base and abutting against the guide rod.

10. The height adjustment device as claimed in claim 7, wherein the first gear rack is located between the guide rod and the second gear rack.

11. The height adjustment device as claimed in claim 7, wherein the first driving unit further has an elastic member sleeved onto the first linking rod and provided with two ends respectively stopped against the base and the first wheel.

12. The height adjustment device as claimed in claim 7, wherein the second driving unit further has an elastic member sleeved onto the second linking rod and provided with two ends respectively stopped against the base and the second wheel.

13. The height adjustment device as claimed in claim 7, wherein the second driving unit further has a pin inserted into a front end of the second linking rod;

the base has a retaining hole with a large hole portion and two opposite small hole portions; the second wheel is rotatable between a first position, at which the second linking rod passes through the large hole portion and the pin passes through the small hole portions, and a second position, at which the pin crosses the small hole portions such that the pin fails to pass through the small hole portions and thus the second linking rod is retained in the large hole portion to enable the second gear to be engaged with the worm and the second gear rack at the same time.

* * * * *